July 11, 1961  P. M. BOURDON  2,991,820
RIMS WITH REMOVABLE EDGE AND WITH TAPERING
SEATS FOR TUBELESS TIRES
Filed Sept. 23, 1957
FIG.1.
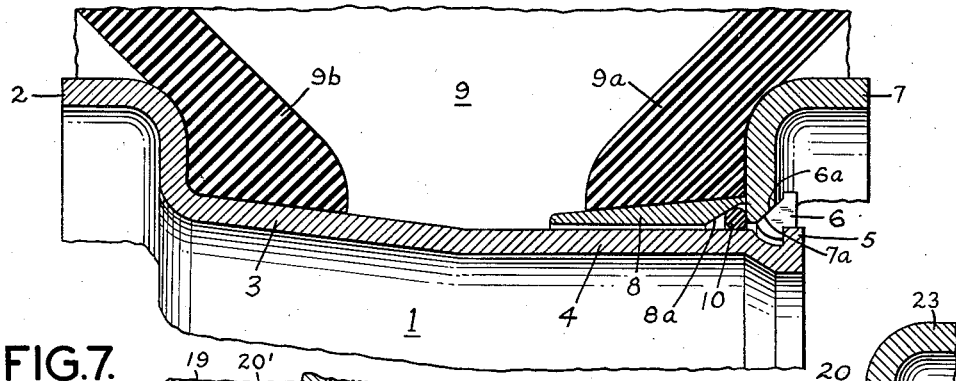
FIG.7.
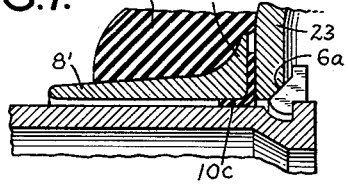
FIG.6.
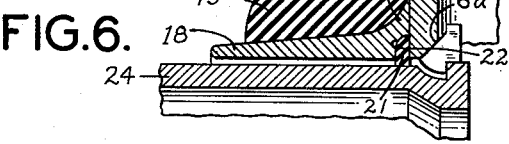
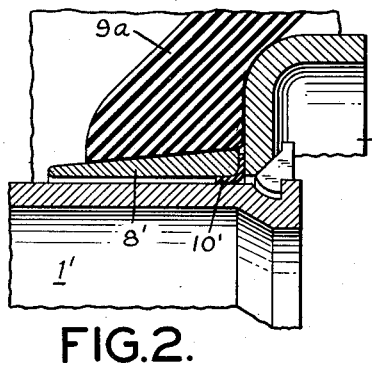
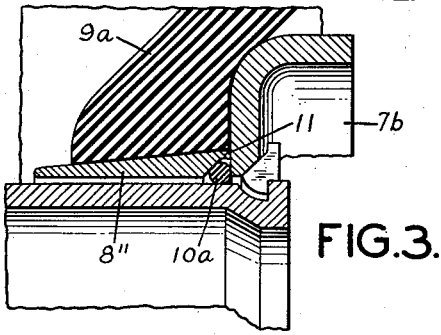
FIG.3.
FIG.2.
FIG.5.
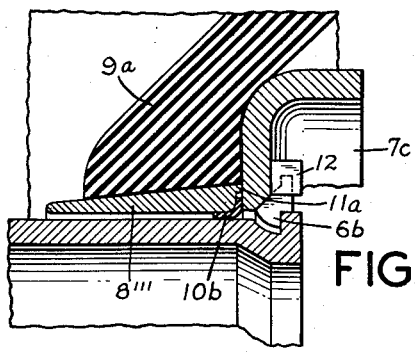
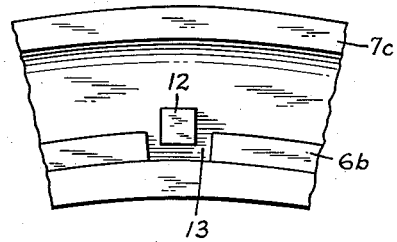
FIG.4.
INVENTOR
PIERRE MARCEL BOURDON
BY
HIS ATTORNEYS

United States Patent Office 2,991,820
Patented July 11, 1961

2,991,820
RIMS WITH REMOVABLE EDGE AND WITH TAPERING SEATS FOR TUBELESS TIRES
Pierre Marcel Bourdon, Paris, France, assignor to Compagnie Generale des Etablissements Michelin (Michelin & Cie), Clermont-Ferrand, France
Filed Sept. 23, 1957, Ser. No. 685,725
Claims priority, application France Oct. 3, 1956
9 Claims. (Cl. 152—410)

This invention relates to improvements in vehicle wheels and it relates particularly to improvements in wheel rims for tubeless tires.

A most important factor in the mounting of tubeless tires is the provision of a rim to which the tire casing can be sealed to form a hermetically sealed chamber. No difficulty usually is encountered in providing an effective seal between the beads of a tubeless tire casing and a rim which has integral bead-engaging flanges thereon. However, it is difficult to remove a deflated casing from the unitary type of rim and equally difficult to mount a tire casing on the rim. Frequently, the beads of the tubeless tire casings are damaged while prying them over the fixed and rigid flange of the rim thus preventing an effective seal between the tire casing and the rim.

Attempts have been made to provide rims in which one of the rim flanges is detachably mounted so as to facilitate the mounting and demounting of the tire casing. Usually such rims have a separate flange ring which is retained in position by means of a split ring engageable in a groove in or with a low flange on the rim to hold the demountable flange in position. With such arrangements, a seal between the detachable flange and the rim is essential and numerous types of sealing means have been suggested therefor. However, none of the prior types of rims having detachable flanges have been wholly satisfactory because of the manner in which the detachable flange is constructed. The sealing means, which usually is a rubber ring or the like has a tendency to be squeezed out by air pressure and extruded partially between the rim and the flange so that leakage occurs and air escapes from the tire. Moreover, some of the wheel rims have a split flange which chafes the bead of the tire and damages it.

The present invention relates to an improved form of rim having a detachable flange thereon in which the beads of the tire casing can be sealed hermetically to the flanges of the rim and the detachable flange sealed hermetically to the base of the rim to prevent leakage and to reduce damage to and wear on the sealing portions of the tire casing itself.

More particularly, a rim of the type embodying the present invention may include a detachable flange that can be secured to the rim base by means of a split ring engaging its outer side. Further, the rim is provided with a separate endless base ring or hoop which engages the inner edge of one of the beads of the tire and supports this bead relative to the rim. The sealing means required with a detachable flange type of rim is interposed between the hoop or base ring, the demountable flange and the base of the rim so that air pressure normally urges the sealing means into air tight engagement with all of these elements and thereby seals the gap between the rim flange and the base portion of the rim.

The construction described generally above has many advantages. In the first place, the removable rim flange enables the tire casing to be removed and mounted more easily. A removable supporting hoop for engaging one bead of the tire enables the rim to be provided with a conical bead engaging surface against which one casing bead can wedge without rendering the removal of the tire casing from the rim difficult. Inasmuch as the supporting hoop slips readily from the rim, the bead of the tire engaging it is easily slipped from the rim. Moreover, mounting of the sealing means between the removable hoop and the detachable flange protects the sealing means itself and also prevents it from being blown out or extruded from the rim and thereby avoids leakage of air from the casing to joints in the flange.

A split ring used for retaining the detachable flange on the rim is entirely out of contact with the sealing ring and cannot cause damage to it by pressure or abrasion.

For a better understanding of the present invention, reference may be had to the accompanying drawing in which:

FIGURE 1 is a cross sectional view through a portion of a rim for mounting a tubeless tire with the bead edges of the tire casing shown fragmentarily;

FIGURE 2 is a sectional view of a portion of the flange and a tire casing, illustrating a modified form of device;

FIGURE 3 is a cross sectional view of a portion of the rim and a tire casing showing a still further modification of the rim embodying the present invention;

FIGURE 4 is a cross sectional view through a portion of the rim and the tire casing illustrating another form of rim construction embodying the present invention;

FIGURE 5 is a partial side elevational view of the rim construction disclosed in FIGURE 4;

FIGURE 6 is a modified form view in cross-section taken through a portion of the rim embodying the invention; and FIGURE 7 is a partial view in cross section, taken through a portion of the rim, of a modification of FIGURE 2.

The invention will be described with reference to a rim having an annular base portion 1 provided at one edge with an integral rim flange 2 and a generally conically formed surface 3 extending between the midportion of the base and the flange 2. To the right of the approximate center line of the base is a portion 4 which is generally cylindrical in shape and terminates in an annular flange 5 provided with a groove for receiving a split retaining ring 6 by means of which a bead engaging flange 7 is demountably or detachably carried by the base 1. Cooperating inclined edges 7a and 6a are formed on the split ring 6 and the rim flange 7 so that when the rim flange 7 is forced to the right as viewed in FIGURE 1 by air pressure in the tire casing 9, the split or retaining ring 6 will be forced tightly against the flange 5, thereby preventing it from loosening and allowing the flange 7 to escape from the rim base 1.

A feature of the present invention is the provision of a continuous hoop member 8 which is received loosely and slidably on the cylindrical portion 4 of the rim and is adapted to engage in one bead 9a of the tire casing 9. The hoop is wider than the bead and fits tightly within the bead and hence moves with the bead during application or mounting of the tire casing on the rim and removal of the tire casing from the rim.

The bead 9b of the tire casing bears against the conical surface 3 and the integral flange 2 and is sealed thereto in the usual way. However, the bead 9a is not sealed to the rim when it is in engagement with the flange 7 and the movable hoop 8. In accordance with the present invention, I provide a sealing ring 10 in such a position that it engages in sealing relation the inner edge portion of the removable flange 7, the outer surface of the cylindrical portion 4 of the rim and a portion of the bead engaging hoop 8. Thus, as shown in FIGURE 1, the ring 10 is interposed between a beveled or chamfered surface 8a on the hoop 8 and is held in the space between the surface 8a and the adjacent surfaces of the flange 7 and the base 1. Air pressure inside the tire casing will result in moving the tire bead 9a outwardly and this movement will urge the hoop tightly against the sealing member 10 and into engagement with the flange 7, thereby forcing the sealing member into sealing engagement with the surface 8a and the adjacent surface of the flange 7 and the rim base 1.

While the sealing member 10 is shown as being circular in cross section in FIGURE 1, it will be understood that it can be of widely varying shape; the hoop 8 will be shaped accordingly. Thus, as shown in FIGURE 2, a sealing member 10′ may be a ring of rubber of L-shaped cross section interposed between the flange 7′, the supporting hoop 8′ and the base portion of the rim 1′, and filling the gap therebtween. In this case, the hoop portion 8′ has an essentially square corner in engagement with the sealing ring 10′.

As shown in FIGURES 3 and 4, it may be desirable to limit the amount of compression to which the sealing members are subjected and to that end, the hoops 8″ and 8‴ are provided with extensions 11 and 11a which engage the removable flanges 7b and 7c. As indicated in FIGURE 3, the sealing member 10a therein is of circular cross section while the sealing member 10b in FIGURE 4 is of L-shaped cross section. It should be understood that the sealing member 10 may have a section which is different from the circular section or L-shaped section shown in FIGURES 1–4. Such section may be, for example, oval or polygonal.

Under some conditions of operation, the hoop 8, 8′, 8″ or 8‴ and the demountable flange 7, 7′, 7b or 7c may tend to rotate relative to the remainder of the rim. Rotation of the demountable flange can be avoided by providing one or more detents or lugs 12 on the outer side of the demountable flange and providing an appropriate notch 13 in the split ring 6b in which the detent or lug is received. Inasmuch as the split retaining ring 6b is clamped tightly against the rim, there is very little possibility of its slipping and movement of the demountable flange 7c is correspondingly limited to the extent of movement of the lug or lugs 12 in the notch or notches 13. If immobilization during rotation of the hoop 8 with respect to the bottom of rim 1 should be desired, a known wedging process may be employed which does not have to be described in detail.

The same procedure is followed for mounting a tire on or removing it from the modified rims shown in FIGS. 2 to 6. FIGURE 6 illustrates another form of sealing ring and hoop in accordance with the invention. In this modification, undesirable lateral sliding of the hoop 18 under the tire bead 19 is prevented by providing the hoop with an outwardly directed radial flange 20. The inner surface of the flange corresponds to the shape of the bead of the tire engageable with it. The flange 20 may be endless or it may be notched or otherwise interrupted. Moreover, the sealing ring 21 may have its upper or outer portion received in a groove 22 in the outer side of the hoop 18 and with its lateral face and inner edge engaging the rim flange 23 and the rim base 24.

If desired, the hoop 8′ in FIG. 2 may also be provided with an outwardly directed lateral flange 20′ as shown in FIG. 7, in order to keep it from sliding laterally, a sealing ring 10c being placed between the flange 20′ and the rim flange 23.

The above-described rim constructions have proved highly successful in preventing leakage when used with tubeless tires and they also greatly facilitate the mounting and demounting of tires. For example, in removing the tire 9 from the rim 1, as shown in FIG. 1, after the split ring 6 is pried loose, the flange 7 is slipped off the rim 1 and the bead on the opposite side of the casing is then broken loose from the integral flange 2. The continuous hoop 8 slips off the cylindrical portion 4 of the rim 1 and remains wedged inside the bead 9a of the casing. Likewise, the bead 9b being engaged with a conical portion of the rim can easily be forced out of engagement with the flange 2 and slipped off of the rim. After the tire is removed from the rim, the retaining hoop 8 can be taken out of the bead 9a.

To mount a tubeless tire, the beads 9a and 9b of the tire are slipped over the narrow edge of the rim and the retaining hoop 8 can either be driven into place in the bead 9a after the tire has been fully mounted or before mounting on the casing. Thereafter, the sealing ring is mounted adjacent the outer edge of the hoop 8, the removable flange 7 is then placed in position against the sealing ring 10 and the split ring 6 is snapped against the flange 5, thereby retaining the tire and rim flange elements on the rim. As air is blown into the tire, the beads of the tire are forced outwardly against the fixed and removable rim flanges and compress the sealing member 10 tightly against the adjacent surfaces of the elements of the rim thereby sealing the entire assembly against escape of air.

It will be understood that the forms of the invention described and illustrated are given as examples and can be modified in numerous ways without departing from the invention. For example, the conical hoop can be mounted in a groove formed in the base of the rim so that the inner edge of the upper surface of the hoop is approximately flush with the adjacent surface of the rim.

Other changes within the scope of the present invention will be apparent to those skilled in the art.

I claim:

1. A rim for mounting a tubeless tire having beads thereon, comprising an annular rim base having a fixed bead-engaging flange at one edge thereof and an endless detachable bead-engaging flange at the other edge, means for releasably retaining said detachable flange on said rim base, an endless bead-supporting hoop removably mounted on said rim base adjacent to and having an outer lateral edge axially adjacent to said detachable flange, and a sealing ring interposed between said rim base, said hoop and said detachable flange and in sealing engagement with continuous peripheral surfaces on said base, hoop and flange for preventing escape of air therebetween.

2. The wheel rim set forth in claim 1 in which said rim base, hoop and detachably mounted flange have relatively inclined surfaces defining an annular space of substantially triangular cross-section therebetween in which said sealing ring is received.

3. The wheel rim set forth in claim 1 in which said rim base, hoop and detachably mounted flange have spaced apart, relatively inclined surfaces defining an annular space of substantially L-shaped cross-section therebetween in which said sealing ring is received.

4. The rim set forth in claim 1 in which said hoop has an inclined surface portion in its outer side edge for engaging and wedging said sealing member against said rim base and detachably mounted flange.

5. The rim set forth in claim 1 in which said hoop has an inclined surface portion in its outer side edge for engaging and wedging said sealing member against said rim base and said detachably mounted flange, and projections on said hoop for engagement with said detachably mounted flange.

6. A rim for mounting a tubeless tire having beads thereon, comprising an annular rim base having a fixed bead-engaging flange at one edge thereof and a conical bead-supporting portion adjacent to said fixed flange, an endless hoop having a radially outer conical bead-supporting surface thereon at least as wide as a bead of said tire and having axially inner and outer side edges, said endless hoop being slidably and removably mounted on said rim base, an endless bead-engaging flange detachably mounted on said rim base and axially engaging the outer side edge of said hoop, means for releasably retaining said detachably mounted flange on said rim base, and an annular sealing member interposed between and in sealing engagement with continuous peripheral surfaces on said rim base, said hoop and said detachably mounted flange.

7. The wheel rim set forth in claim 6 in which said rim base, the outer side edge of said hoop and said detachably mounted flange have relatively inclined surfaces defining an annular space of substantially triangular cross-section therebetween in which said sealing ring is received.

8. The wheel rim set forth in claim 6 in which said rim base, the outer side edge of said hoop and said detachably mounted flange have spaced apart relatively inclined surfaces defining an annular space of substantially L-shaped cross-section therebetween in which said sealing ring is received.

9. The wheel rim set forth in claim 1 in which said endless hoop has an outer bead-engaging surface inclined inwardly toward said rim base and a radially extending bead-engaging flange adjacent to and engageable with said detachably mounted flange.

References Cited in the file of this patent
UNITED STATES PATENTS

| | | |
|---|---|---|
| 880,332 | Scott | Feb. 25, 1908 |
| 2,700,999 | Lemmerz | Feb. 1, 1955 |
| 2,822,017 | Herzegh | Feb. 4, 1958 |
| 2,822,021 | Shipman et al. | Feb. 4, 1958 |
| 2,900,006 | Lafaye | Aug. 18, 1959 |
| 2,904,096 | Mueller | Sept. 15, 1959 |